June 13, 1950 H. J. DIBBLEE 2,510,963
VIBRATION ISOLATOR
Filed Dec. 20, 1944

INVENTOR.
HAROLD J. DIBBLEE
BY
William D. Hall.
ATTORNEY

Patented June 13, 1950

2,510,963

UNITED STATES PATENT OFFICE 2,510,963

VIBRATION ISOLATOR

Harold J. Dibblee, Eaton, Ohio

Application December 20, 1944, Serial No. 569,068

6 Claims. (Cl. 248—358)

(Granted under the act of March 3, 1883, as amended April 30, 1928; 370 O. G. 757)

The invention described herein may be manufactured and used by or for the Government for governmental purposes, without the payment to me of any royalty thereon.

The invention to be hereinafter described relates to anti-vibration and shock isolation devices.

The destructive effects of vibration and shock in operating machinery of various types is too well known to question. There have been innumerable devices ranging all the way from simple pads between moving parts to complicated mechanisms, fluid systems and the like, aimed at counteracting, offsetting, dampening, or isolating the vibration. In every case the purpose and result aimed at has been to prevent transmission of the vibration or shock from the machine or other source of origin to some other object. One very great field in which such prevention is exceptionally important is that of aircraft. There is a great deal of vibration in a plane and there are many machines, instruments and devices carried by all planes and more or less affected by such vibrations.

In the known simpler devices such as rubber blocks, coil springs, etc., the action is neither sufficiently universal nor of sufficiently wide range. The more intricate or complicated means or devices have many other objections including that of difficulty of repair, expense both in original cost and in repair, space required and cumbersomeness. Also, the more complicated means and systems are, generally, far less sensitive and correspondingly slower in effect.

The main objects of the present invention are to overcome the above and other objections and provide a simple, efficient, sensitive, and compact device of the character described capable of quantity production at low cost and readily and quickly applicable and removable in the least time and with minimum labor.

In order to more clearly disclose the construction, operation, and use of the invention, reference should be had to the accompanying drawings.

Throughout the several figures of the drawings like reference characters designate the same parts in the different views.

Figure 1:
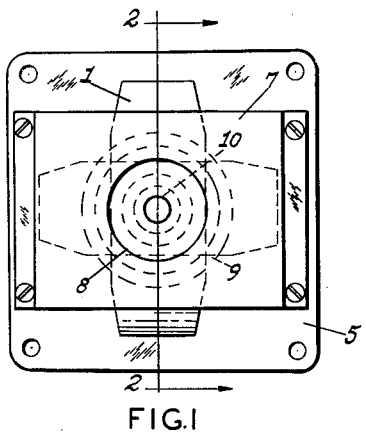
Figure 1 is a plan view of an anti-vibration device embodying the present invention, with the yoke in place.
Figure 2:
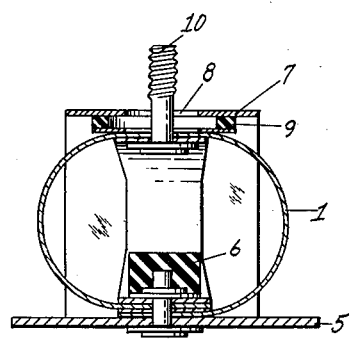
Figure 2 is a cross section on line 2—2 of Fig. 1.

It has been found that beryllium copper is a very suitable or acceptable material for the main elements of the device. As will be readily understood, the thickness and width of the respective bands comprising the device will be determined, in great part, by the weight to be imposed on them, the force of the blows or shocks imposed by the vibrations, the rapidity of the vibrations and various other circumstances.

Preferably, a band 1 having its center portion enlarged as at 2 is used as the principal element of the device. This enlargement extends preferably for about one third of the length of the band. From a short distance to either side of the mid-length of the band, to the end of the enlarged section, the band tapers to the lesser width 3. A simple and satisfactory construction is a maximum width, with parallel edges, at and for a short distance from the mid-length, as shown. Through this central section of maximum width is provided the opening 4 for connection to the source of vibration. In the preferred construction two such bands are used, each formed or bent into a circle or a very broad ellipse. They are disposed at right angles, with the openings 4 aligned. Each end of each band is also provided with an opening or perforation for connection to a rigid base 5, here shown as square though other shapes may be used. Where an ellipse is used, the long axis of the ellipse is disposed parallel with the base 5. In assembling, the ends are secured together and to the approximate center of base 5 by any suitable means such as a rivet run therethrough. Accordingly, in assembled relation, the two bands are positively and permanently secured in intersecting circular or elliptical disposition by a single rivet or like means passed therethrough. These bands are not secured together at their diametrically opposite intersection where they are provided with the openings 4. This single point of connection of all band ends to the base 5, the bands being approximately circumferential bands of a sphere, provide appreciable freedom to or of rolling motion of the assembled bands relative to that point of connection, greatly aiding the anti-vibration action of the device. Substantially, such an assemblage provides a sensitive, resilient spring couple between a base and a source of vibration acting to effectively damp out or prevent transmission of the vibration to the base.

The cradle, rack, carriage or frame member of the vibrating object, such as a motor or other machine or piece of equipment, may be connected in usual well known manner to the respective anti-vibration devices. For instance, simple nut and bolt connections are regularly used. In the drawings a threaded rod 10 is shown in place as part of one of the devices of this invention. Of course, an independent or separate nut and bolt may be used. Incidentally, the number of these anti-vibration devices required for any particular equipment will vary with and depend on the weight and size of it and on various other characteristics and circumstances. The respective connecting bolts are passed through the aligned holes 4 of the corresponding anti-vibration mount and connected to it by nuts turned thereon in usual and well known manner, one nut on each side of the assembled bands, when the separate nut and bolt connections are used. In this way, as will be well understood, the object which is the source of vibration will be wholly and entirely, flexibly and resiliently supported on and by the anti-vibration mounts of this invention.

Since all parts of the device of this invention are electrically conductive, there is no need to bridge a rubber or other nonconducting member with a section of cable as has heretofore been necessary with many mounts on the market. This, of course, completely eliminates many objections regularly encountered in many mounts now in use, as will be well understood.

While these devices will be constructed and proportioned with reference to the loads to be supported as well as in due regard to all other known factors affecting their construction, it will be obvious that there may be times when the forces of the vibrations or shocks are so great as to compress the bands, perpendicularly to base 5, beyond the predetermined point. To cushion any such excessive vibration or shock, a block 6 of felt, synthetic or other rubber, or substantially equivalent material is mounted in any desired manner over the riveted end of the bands and directly in line with the opposite intersection of the bands 1. Thus, as the bands of the respective anti-vibration device are suddenly drawn toward base 5, block 6 will receive the excess shock and prevent collapse of the bands.

In order to guard against the flying off of parts if the bands should fail under operation, a yoke 7 is provided. This yoke may be substantially U-shaped and placed to straddle the assembled members 1 with its ends suitably anchored or secured to base 5. In position, it is spaced to permit normal unloaded or non-compressed extension of members 1 perpendicularly to base 5 and to accommodate therewithin a cushioning block 9, hereinafter referred to. Said yoke 7 is provided with an opening 8 adapted to be aligned with openings 4. On the under side of yoke 7, about the opening 8, is disposed a cushioning block 9 similar to block 6 and operating in the same way as 6 except that it counteracts excessive vibration forces in the opposite direction. Should the bands 1 break, yoke 7 will tend to prevent parts flying about, due to the vibrations. Also yoke 7 will tend to act to restrain and brace the remaining members against the extra forces imposed on them by failure of one of the bands 1.

Figure 3:
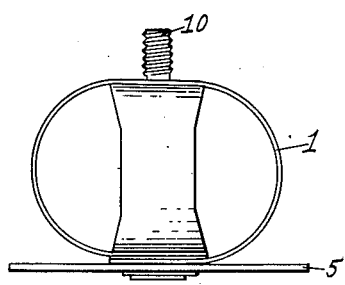
Figure 3 is a side elevation, without the yoke.
Figure 4:
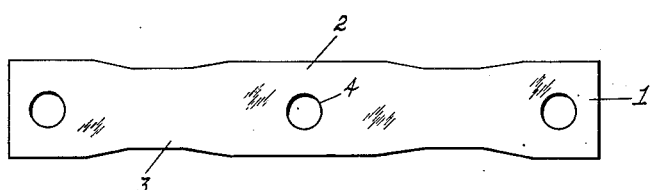
Figure 4 is a plan view of one of the bands of said device before curving to shape.

The assembly without yoke 7 and block 9 (as shown in Figure 3) is thoroughly operable, practicable and efficient. These parts, 7 and 9, do operate beneficially, as indicated, but are not essential to efficient operation and use of the fundamental elements of the invention. While desirable under some circumstances, they may, in many instances, be wholly omitted.

As a result of very thorough tests of a number of constructions involving metal bands curved to provide leaf spring assemblies, it has been found that the construction and arrangement herein illustrated and described gives most satisfactory results. Due to the gradual curvatures of the bands the device is very sensitive and, accordingly, very responsive in directions parallel with the base as well as in directions perpendicular to the base. By arranging the two bands at right angles each in effect braces the other so that the resulting assembly is self sustaining and will not collapse in either or any direction. Likewise, that arrangement provides anti-vibration means in the various directions other than those above mentioned.

By appreciably broadening the bands 1 at 2, added surface and strength are provided at the one point where greatest strain is applied. In flexing due to compression by the load, the sharpest bend is along the line of upper intersection of the bands, along the four lines where the edges of one band cross the face of the other, forming a rectangle about the aligned openings 4.

It goes without saying that beryllium copper is a good conductor of electricity and, therefore, a good ground for equipment with which it may be used. As will be well understood by those skilled in the art to which this invention relates, mounts of this invention are readily interchangeable with many of the mounts regularly in use at the present time. Its durability has been amply established by many long severe tests. It makes use of readily obtainable materials. It has been definitely established as highly efficient in anti-vibration and vibration isolation ability as to vibration or shock in any direction. It possesses very low natural resonant frequency.

While the yoke 7 has been specifically illustrated it is to be understood that a complete cap, cup or housing is a very acceptable means for accomplishing the same result. It is not thought either necessary or desirable to further illustrate that member as such construction will be very well understood from the description.

It is thought that the construction, operation, and use of the invention will be clear from the preceding detailed description.

Many changes may be made in the construction, arrangement and disposition of the several parts of the invention, within the scope of the appended claims without departing from the field of the invention and it is meant to include all such within this application wherein only one preferred form has been illustrated purely by way of example and with no thought of, in any degree, limiting the invention thereby.

Having thus described my invention what I claim and desire to protect by Letters Patent is:

1. An anti-vibration device of the character described to sustain a load relative to a base, comprising a resilient loop provided with means for connecting one portion thereof to the load and another portion thereof to the base, and a restraining yoke straddling said loop to prevent the load from separating from the base in the event of failure of the said loop.

2. An anti-vibration device of the character described comprising resilient bands each bent into the approximate form of a circular loop with their ends in overlapping contact relation, said overlapped ends being provided with aligned perforations, a connecting bolt passed through said perforations, means passed through aligned diametrically opposite portions of said loops for attaching said loops to an object, and a yoke coupled to said connecting bolt and straddling said loops so as to allow free vibratory movements of said loops but restraining said last mentioned means and said object from excessive movement in the event of vibrations of unduly large amplitude or breakage of one or more of said loops.

3. In a vibration isolator to sustain a load relative to a base, a band of springy material having its two ends overlapped to form a loop, fastening means to secure the overlapped ends aforesaid to a base, second fastening means to secure a portion of the looped band substantially opposite the overlapped ends to a load, and yoke means linking said fastening means to each other to prevent the load from moving away from the base more than a predetermined maximum distance.

4. In a vibration isolator to sustain a load relative to a base, two loops arranged so as to have their planes normal to each other and so that the line of intersection of said planes is diametrically disposed relative to both of said loops, each of said loops formed of a band of springy material having its ends overlapped, the overlapped ends of the two loops being in register at one intersection of said loops and the substantially diametrically opposite portions of said loops being in register at the other intersection of said loops, fastening means to secure the four overlapped ends of said bands to a base, second fastening means to secure the two opposite portions of said loops to a load, and a yoke straddling said loops to prevent the load from separating from the base in the event of failure of the loops or undue extension thereof.

5. In a vibration isolator to sustain a load relative to a base, a base, two loops at right angles to each other and intersecting at two diametrically opposite points, each of said loops comprising a length of springy material with its opposite ends overlapping, fastening means to secure said loops at one intersection to said base member, second fastening means to secure said loops at the second point of intersection to a load, means to secure the base member to the base, a restraining yoke secured to the base member and straddling the loops so as not to interfere with normal operation of said isolator but to prevent undue deformation of said loops and to prevent separation of said load from said base in the event of failure of said loops.

6. In a vibration isolator, a base member, a plurality of bands of springy material, each band having its ends overlapping so as to form a loop, said loops being disposed substantially as intersecting great circles of a sphere, the overlapping ends of all of said bands being secured to the base member, the intersecting central portions of said several bands being provided with openings in mutual register, fastening means extending through said openings, means on said fastening means to secure a load thereto, and a yoke secured to said base member and straddling said loops and provided with an aperture encircling said fastening means, said aperture being of a size to allow free operational movements of said loops and said fastening means during normal operation of said isolator, said yoke adapted to prevent undue deformation of said loops and separation of the load from the base in the event of failure of said loops.

HAROLD J. DIBBLEE.

REFERENCES CITED

The following references are of record in the file of this patent:

UNITED STATES PATENTS

| Number | Name | Date |
|---|---|---|
| 6,740 | Warren | Sept. 25, 1849 |
| 122,111 | Duffy | Dec. 26, 1871 |
| 138,438 | Richardson | Apr. 29, 1873 |
| 1,156,859 | Hamilton | Oct. 12, 1915 |
| 1,912,451 | Hibbard | June 6, 1933 |

FOREIGN PATENTS

| Number | Country | Date |
|---|---|---|
| 574 | Great Britain | Feb. 10, 1877 |
| 541,416 | Germany | Dec. 17, 1931 |